United States Patent
Wheaton et al.

(10) Patent No.: US 12,343,643 B2
(45) Date of Patent: Jul. 1, 2025

(54) CONTROLLER STRAP AND BATTERY DOOR FOR A VR HEADSET

(71) Applicant: Meta Platforms Technologies, LLC, Menlo Park, CA (US)

(72) Inventors: Christopher Sean Wheaton, San Francisco, CA (US); Riley Hageman, Seattle, WA (US); David Michael Pickett, Seattle, WA (US); Brett Cross, Sunnyvale, CA (US); Ian Andrew Schemp, Edmonds, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 447 days.

(21) Appl. No.: 18/048,742

(22) Filed: Oct. 21, 2022

(65) Prior Publication Data

US 2024/0131440 A1 Apr. 25, 2024
US 2024/0226758 A9 Jul. 11, 2024

(51) Int. Cl.
*A63F 13/98* (2014.01)
*A63F 13/24* (2014.01)

(52) U.S. Cl.
CPC ............ *A63F 13/98* (2014.09); *A63F 13/24* (2014.09)

(58) Field of Classification Search
CPC .... A63F 13/98; A63F 13/24; A45F 2005/006; A45F 2005/008; A45F 5/00; A45B 2009/002; A45B 2009/025
See application file for complete search history.

(56) References Cited

U.S. PATENT DOCUMENTS

| | | | |
|---|---|---|---|
| 7,207,118 B2 | 4/2007 | Watters et al. | |
| 9,256,081 B2* | 2/2016 | McPhail | G02C 5/001 |
| 9,387,396 B2* | 7/2016 | Hijmans | A63F 13/245 |
| 2004/0075268 A1 | 4/2004 | Manninen et al. | |
| 2008/0296325 A1 | 12/2008 | Tepper | |
| 2012/0244944 A1* | 9/2012 | Kotkin | A63F 13/24 463/37 |
| 2022/0370896 A1* | 11/2022 | Ikeda | G06F 3/016 |
| 2024/0149149 A1* | 5/2024 | Christensen | A63F 13/92 |

FOREIGN PATENT DOCUMENTS

FR 2594702 A1 8/1987

OTHER PUBLICATIONS

EPO—International Search Report and Written Opinion for International Application No. PCT/US2023/032097, mailed Jan. 4, 2024, 10 pages.

* cited by examiner

*Primary Examiner* — Peter J Iannuzzi
(74) *Attorney, Agent, or Firm* — McDermott Will & Emery LLP

(57) ABSTRACT

A lanyard to hold a controller for a headset is provided. The lanyard includes a strap anchored on a top portion of a lid for a battery case of the controller, and a clip anchored to an opening pin in a bottom portion of the lid for the battery case of the controller. The strap includes a stretchable fabric and multiple sticky pads on an outer face that adhere to the stretchable fabric when the strap is looped around the clip. A headset using a controller that includes a lanyard as above, and the controller, are also provided.

20 Claims, 5 Drawing Sheets

CONTROLLER STRAP AND BATTERY DOOR FOR A VR HEADSET

BACKGROUND

Field

The present disclosure is generally related to accessories for virtual reality (VR) headsets. More specifically, the present disclosure is related to a strap to securely attach a hand controller to a user for high mobility immersive applications such as gaming, sports, or fitness applications.

Related Art

Current applications of VR headsets lack appropriate strappings for controllers and accessories that may be used in high mobility immersive applications, wherein appropriate fixing to user's hands and head is paramount. In some cases, strong straps and lanyards can be added ad-hoc but end up getting in the way of the complex input mechanisms (finger buttons and other controls) and in fact impeding or hampering the user interface of the accessories.

SUMMARY

In a first embodiment, a lanyard to hold a controller includes a strap anchored on a top portion of a lid for a battery case of the controller, and a clip anchored to an opening pin in a bottom portion of the lid for the battery case of the controller. The strap includes a stretchable fabric and multiple sticky pads on an outer face that adhere to the stretchable fabric when the strap is looped around the clip.

In a second embodiment, a controller for a headset includes a handle portion configured to be grabbed by a hand of a headset user, a one or more buttons to be actuated by one or more fingers in the hand of the headset user, a battery case enclosed by a lid in the handle portion, and a lanyard to secure the controller to the hand of the headset user. The lanyard includes a strap anchored on a top portion of the lid and a clip anchored to an opening pin in a bottom portion of the lid. The strap includes a stretchable fabric and multiple sticky pads on an outer face that adhere to the stretchable fabric when the strap is looped around the clip.

In a third embodiment, a device for virtual reality applications includes a headset with a display configured to provide an immersive reality environment for a user, a left-hand controller and a right-hand controller, each including a handle portion configured to be grabbed by a hand of a headset user, a one or more buttons to be actuated by one or more fingers in the hand of the headset user, a battery case enclosed by a lid in the handle portion, and a lanyard to secure the left-hand controller and the right-hand controller in the hand of the headset user. The lanyard includes a strap anchored on a top portion of the lid, and a clip anchored to an opening pin in a bottom portion of the lid. The strap includes a stretchable fabric and multiple sticky pads on an outer face that adhere to the stretchable fabric when the strap is looped around the clip.

These and other embodiments will be described in the following disclosure, in view of the accompanying drawings.

In the figures, elements and steps having the same or similar referral numbers are associated with the same or similar attributes and description, unless stated explicitly otherwise.

DETAILED DESCRIPTION

When playing fitness games in VR, users move their hands and arms vigorously, often losing hold of their controllers and causing damage in the process. Embodiments as disclosed herein resolve the above problem by providing comfortable and secure straps for hand controllers in a VR headset that allow seamless operation of the inputs with the user's fingers. Accordingly, users may free their hands and fingers from having to grab the controllers, thus enhancing the immersive experience for the users.

Designed for fitness, in some embodiments, a lanyard includes a hand controller strap connected to a top portion of a lid for the battery casing and connects to an anchor at the bottom of the battery door. The strap loops around a metal clip and is attached to its outer side by inter-locking of fibers making up the strap fabric. The fabric includes loops that enable stretching and a comfortable air flow throughout, thus providing an ergonomically pleasing and useful feature. A simple compression of sticky pads on one side of the strap to the outer side locks the strap around the user's hand and may be detached simply by peeling the strap from itself, pulling from a hardened tip. The stretchable fabric of the lanyard may include a sweat resistant material (e.g., nylon). When the strap is put in place (e.g., with an adjustable length), it locks the controller into the user's hand. In some embodiments, a push button mechanism at the bottom of the lid for the battery casing locks the batteries and holds a clip to loop the strap around at the bottom part of the lanyard. A hardened tip of the strap (e.g., made of plastic) is used to depress the push button and release the lid to access the battery case. In some embodiments, a lanyard accessory may be included in a controller for a headset used for immersive fitness applications.

Materials used in the lanyard, including the strap, the clip, the push button, and the hardened tip for the controller handle and the lid of the battery case, may be chosen to resist cracking caused by chemical or radiation exposure (e.g., UV light in daylight).

Figure 1:
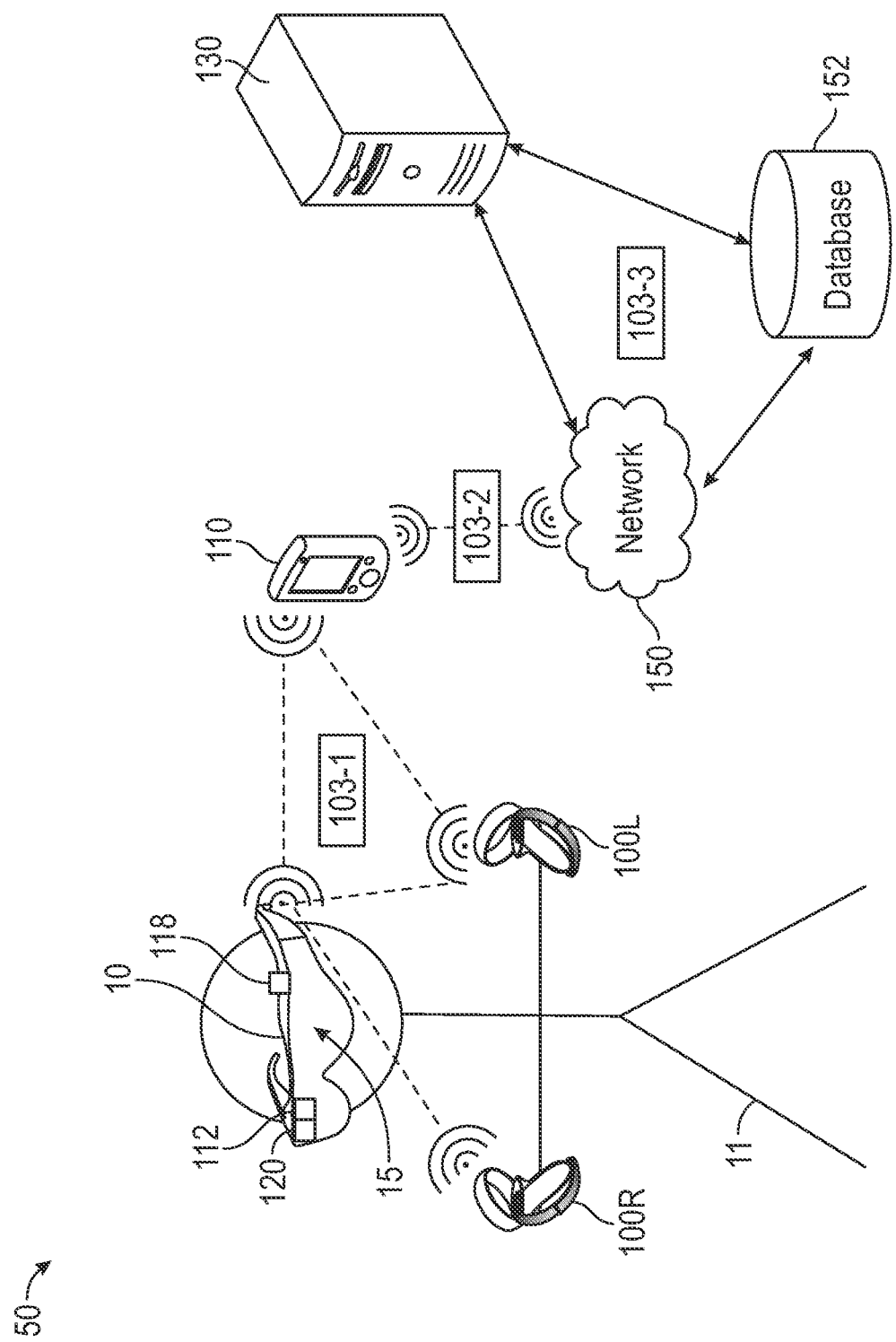
FIG. 1 illustrates an architecture with a VR headset including controllers strapped to a user's hand and paired to a mobile device and to a remote server via a network, according to some embodiments.

FIG. 1 illustrates an architecture 50 with a VR headset 10 including controllers 100R and 100L (left and right-handed, hereinafter, collectively referred to as "controllers 100") strapped to a hand from a user 11 and paired to a mobile device 110 and to a remote server 130 via a network 150, according to some embodiments. VR headset 10 may include a memory circuit 120 storing instructions and a processor circuit 112 configured to execute the instructions to cause VR headset 10 to perform operations as disclosed herein. For example, some of the operations may include providing in a display 15 for user 11 an immersive view of a fitness application, or a virtual game, wherein user 11 performs rapid movements and triggers actions through controllers 100. According to embodiments disclosed herein, controllers 100 are securely strapped to the hands of user 11, thereby enabling the user to concentrate on the activity elicited by the immersive application running in VR headset 10. A communications module 118 may include circuitry, software, and firmware (e.g., radiofrequency hardware such as antennas, radios, digital circuit processing, digital to analog converters, analog to digital converters, phase locked loops, and the like) configured to enable the headset to communicate wirelessly or otherwise with mobile device 110, and network 150.

The application may be partially sourced via mobile device 110, and remotely hosted by server 130. A first dataset 103-1 may be transmitted between controllers 100, VR headset 10, and mobile device 110. A second dataset 103-2 may be transmitted between mobile device 110 and network 150, and a third dataset 103-3 may be transmitted between server 130 and a database 152. Datasets 103-1, 103-2, and 103-3 will be collectively referred to, hereinafter, as "datasets 103."

Figure 2A:
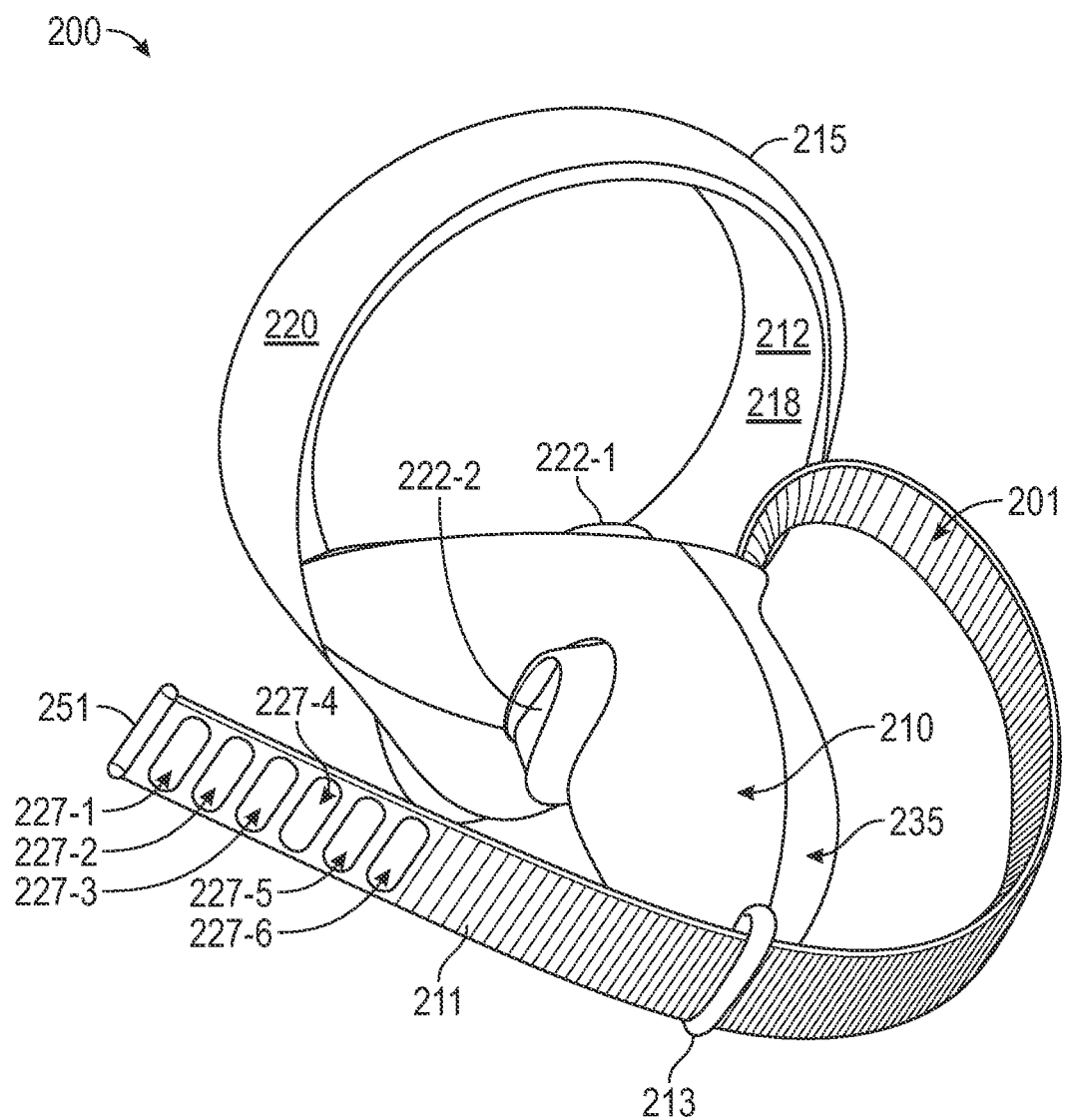
FIGS. 2A-2B illustrate different perspectives of a controller including a lanyard for strapping to a user's hand, according to some embodiments.
Figure 2B:
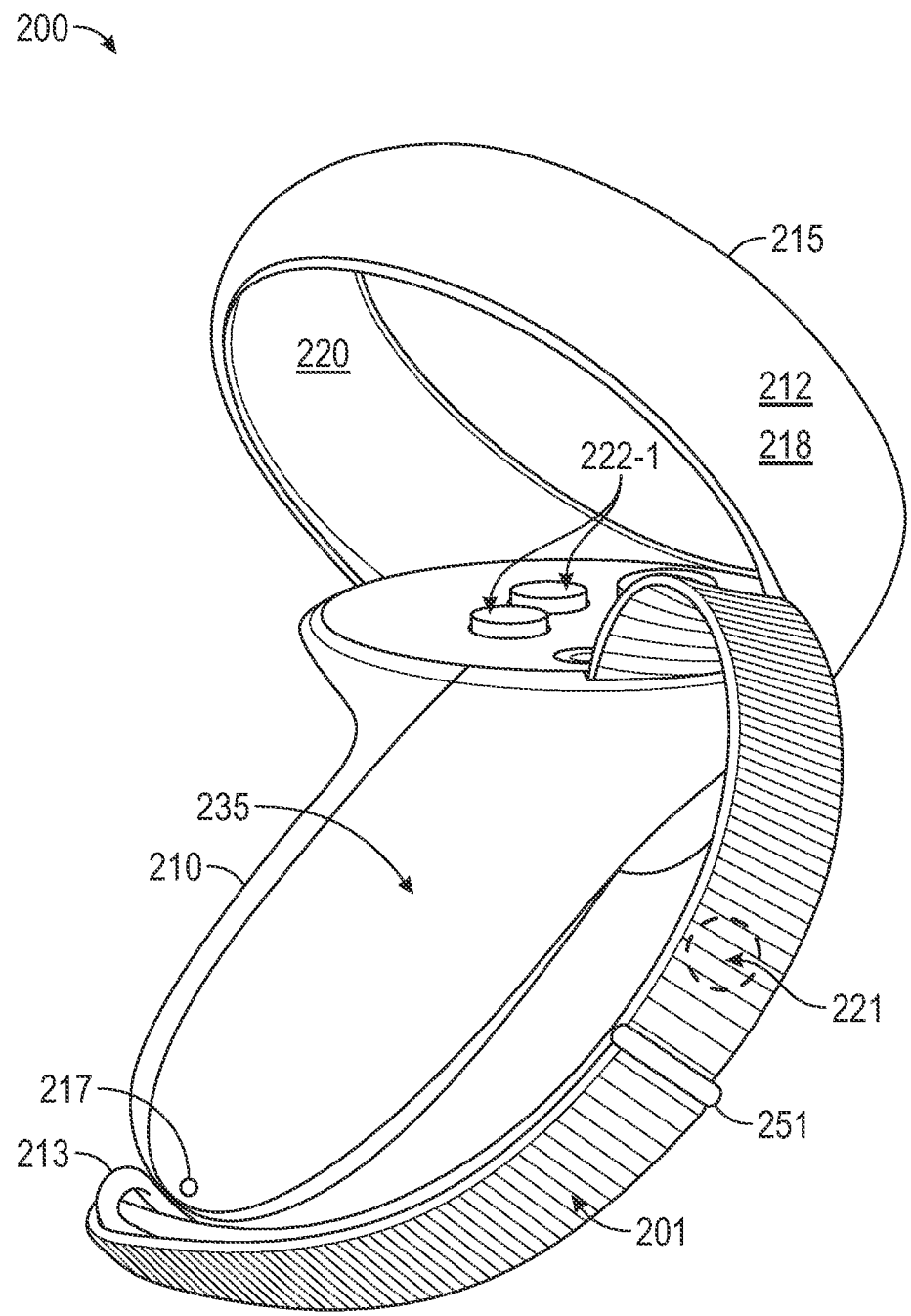

FIGS. 2A-2B illustrate different perspectives of controller 200 including a lanyard 201 for strapping to a user's hand, according to some embodiments. Controller 200 includes a handle portion 210 configured to be grabbed by a hand of a headset user, and a three-dimensional (3D) tracker ring 215. Handle portion 210 may include one or more buttons 222-1, and trigger button 222-2 (hereinafter, collectively referred to as "trigger buttons 222"), actuated by one or more fingers in the hand of the headset user. Handle portion 210 also includes a battery case enclosed by a lid 235.

Lanyard 201 secures controller 200 to the hand of the headset user. Lanyard 201 includes a strap 211 anchored on a top portion of lid 235; and a clip 213 anchored to an opening pin 217 in a bottom portion of lid 235. In some embodiments, strap 211 is made of a stretchable fabric 221 and multiple sticky pads 227-1, 227-2, 227-3, 227-4, 227-5, and 227-6 (hereinafter, collectively referred to as "sticky pads 227") on an outer face that adhere to stretchable fabric 221 when strap 211 is looped around clip 213.

Controller 200 further includes a communications module 218, a memory 220 storing multiple instructions, and a processor 212 to execute the instructions. Communications module 218 provides a trigger action from buttons 222 to an immersive application running in the headset when actuated by a finger of the headset user. Lanyard 201 secures controller 200 to the hand of the headset user and moves according to a fitness application running in the headset and communicates with the fitness application via the one or more buttons 222. Stretchable fabric 221 includes a webbing with multiple integrated loops, and sticky pads 227 include polyester fibers that are hooked within the integrated loops to securely attach controller 200 to a hand of a user. In some embodiments, stretchable fabric 221 includes an elastomeric material including nylon fibers.

In some embodiments, strap 211 includes a tip 251 formed with a hardened edge, and wherein the opening pin 217 is actuated upon with the hardened edge to open lid 235 for the battery case. In some embodiments, strap 211 is configured to fix controller 200 to a hand of a user such that the user is free to activate buttons 222 in controller 200 without additionally holding controller 200.

Figure 3:
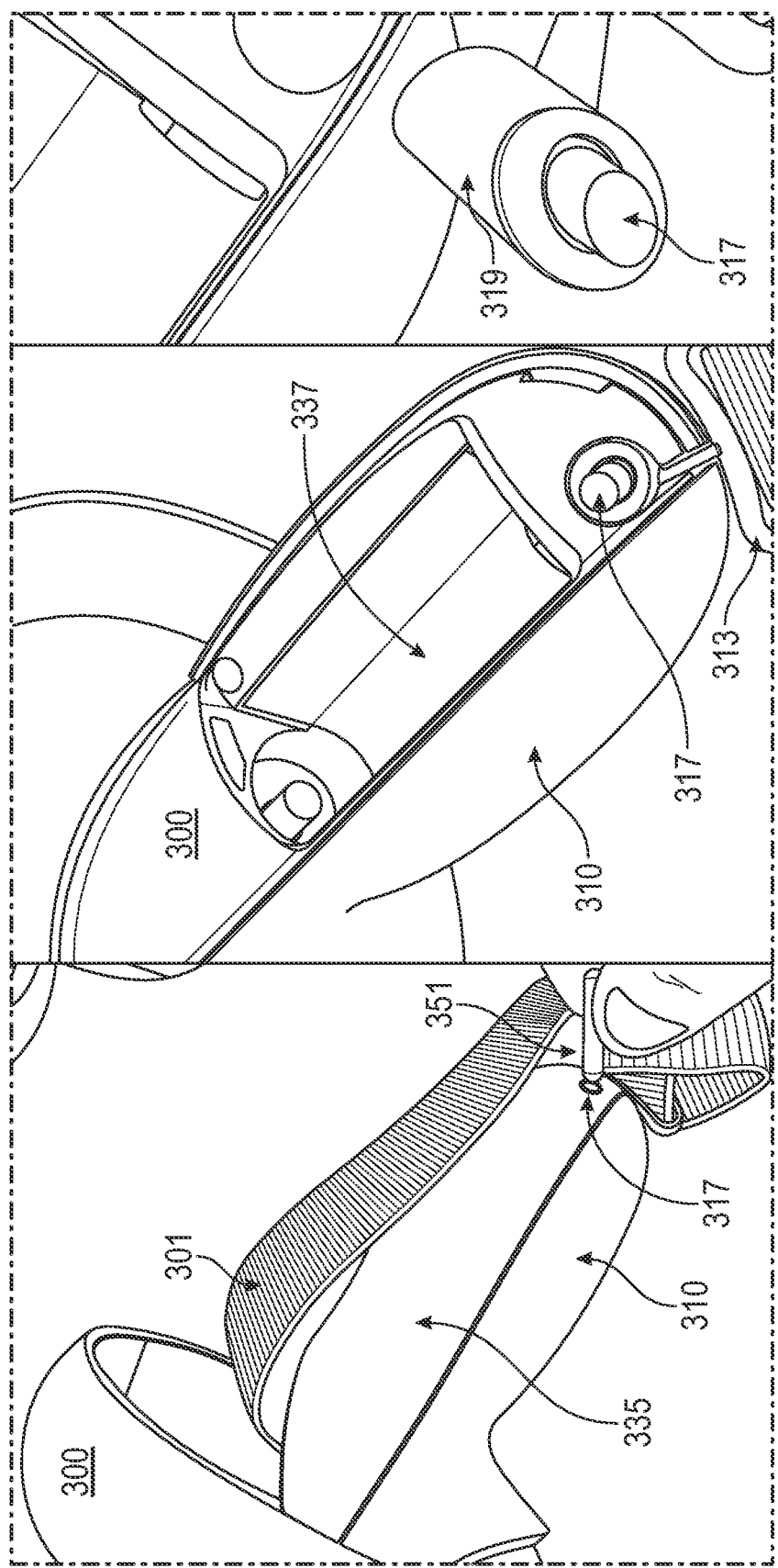
FIG. 3 illustrates a push pin to open a battery lid with the hardened end of a lanyard in a hand controller, according to some embodiments.

FIG. 3 illustrates a push pin 317 to open a lid 335 to a battery case 337 with the hardened end of a tip 351 in a hand controller 300, according to some embodiments. A lanyard 301 straps handle portion 310 to the hand of a user of controller 300. The user presses tip 351 on opening pin 317, which releases lid 335. A casing 319 includes the spring-loaded mechanism that keeps opening pin 317 in a lock configuration for lid 335. In some embodiments, casing 319 and a strap on clip 313 are formed into one metal piece.

Figure 4:
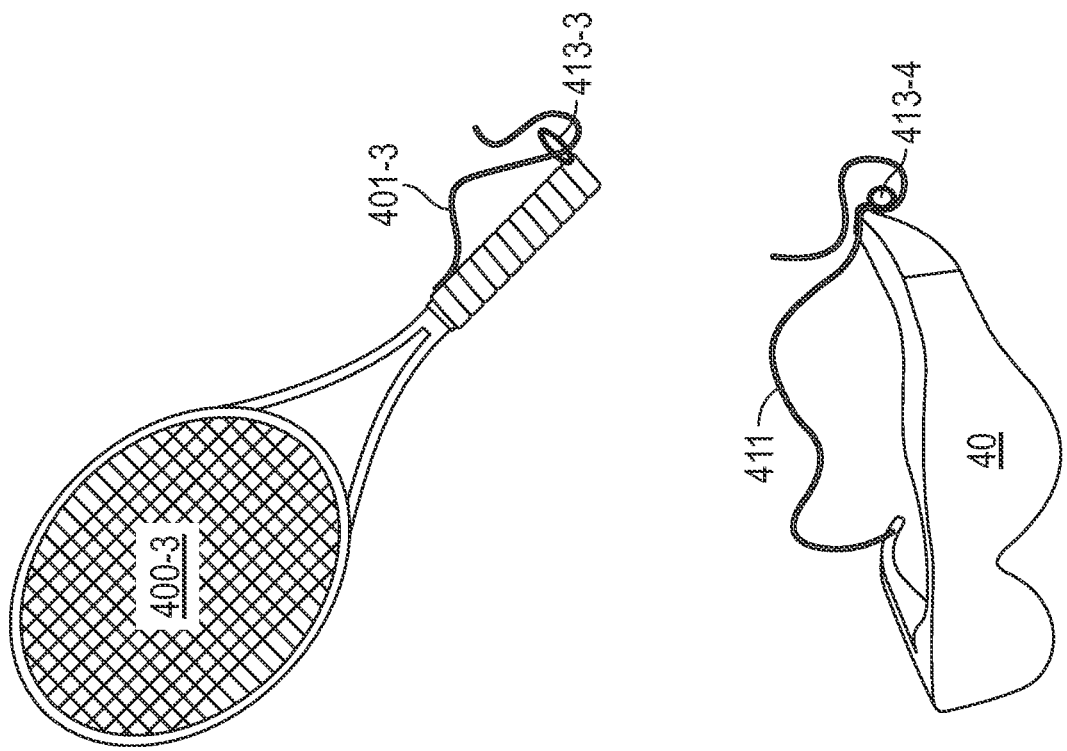
FIG. 4 illustrates multiple controllers for use in VR applications including lanyards for securely strapping onto user hands, according to some embodiments.
Figure 4:
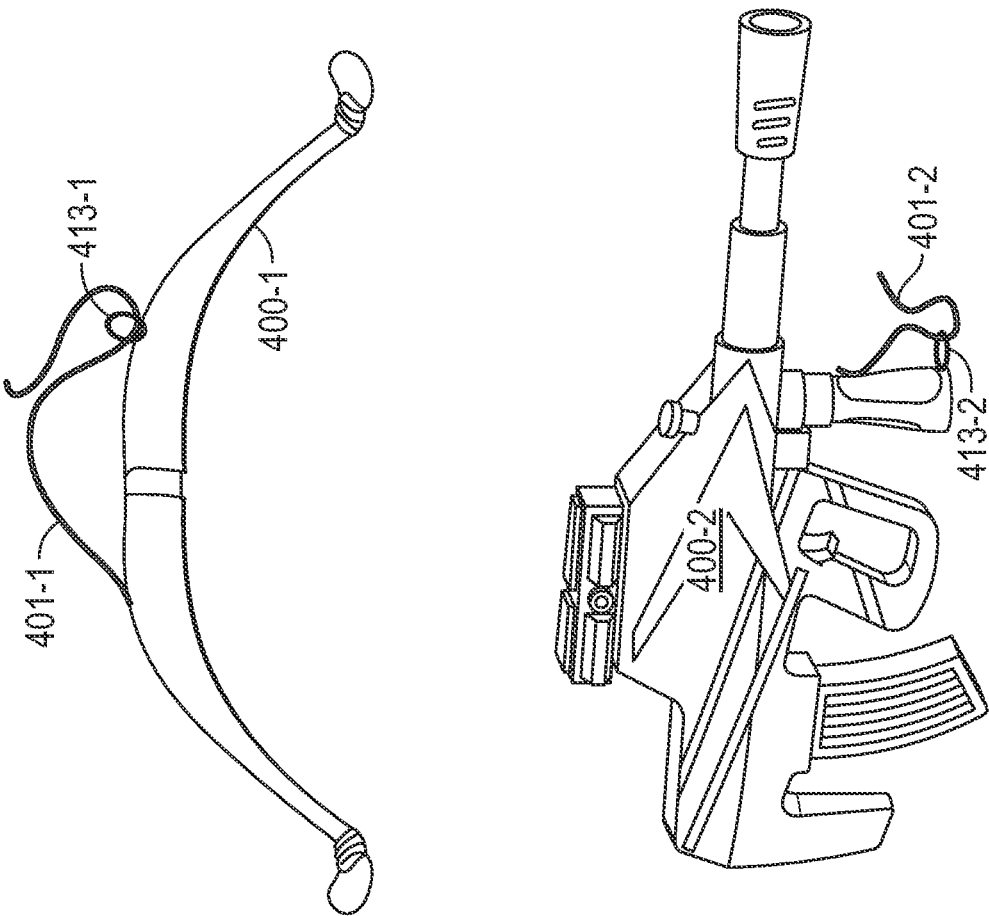

FIG. 4 illustrates multiple controllers 400-1, 400-2, and 400-3 (hereinafter, collectively referred to as "controllers 400") for use in VR applications including lanyards 401-1, 401-2, and 401-3 (hereinafter, collectively referred to as "lanyards 401") for securely strapping onto user hands, according to some embodiments. Controllers 400 may include mock toys such as a bow 400-1 (e.g., for a bow and arrow hunting or fight VR application), a toy gun 400-2 (e.g., for a zombie apocalypse game application), or a tennis racquet 400-3 (e.g., for a tennis application). The VR application may be running in VR headset 40. In some embodiments, a VR headset 40 may also be securely attached to a user's head with a strap 411, looping around a clip 413-4, as disclosed herein.

Lanyards 401 and strap 411 may include straps made of stretchable fabrics, as disclosed herein, configured to wrap around user's hands looping through clips 413-1, 413-2, 413-3 and 413-4 (hereinafter, collectively referred to as "clips 413").

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A lanyard to hold a controller, comprising:
   a strap anchored on a top portion of a lid for a battery case of the controller;
   and a clip anchored to an opening pin in a bottom portion of the lid for the battery case of the controller, wherein:
   the strap includes a stretchable fabric and multiple sticky pads on an outer face that adhere to the stretchable fabric when the strap is looped around the clip.

2. The lanyard of claim 1, including an end that is permanently fixed to an inner portion of the lid for the battery case.

3. The lanyard of claim 1, wherein the stretchable fabric includes a webbing comprising multiple integrated loops, and the sticky pads include polyester fibers that are hooked within the multiple integrated loops to securely attach the controller to a hand of a user.

4. The lanyard of claim 1, wherein the strap includes a tip formed with a hardened edge, and wherein the opening pin is actuated upon with the hardened edge to open the lid for the battery case.

5. The lanyard of claim 1, wherein the stretchable fabric includes an elastomeric material including nylon fibers.

6. The lanyard of claim 1, wherein the strap is configured to fix the controller to a hand of a user such that the user is free to activate one or more buttons in the controller without additionally holding the controller.

7. A controller for a headset, comprising:
   a handle portion configured to be grabbed by a hand of a headset user;
   a one or more buttons to be actuated by one or more fingers in the hand of the headset user;
   a battery case enclosed by a lid in the handle portion; and
   a lanyard to secure the controller to the hand of the headset user, the lanyard comprising:
     a strap anchored on a top portion of the lid;
     and a clip anchored to an opening pin in a bottom portion of the lid, wherein:
     the strap includes a stretchable fabric and multiple sticky pads on an outer face that adhere to the stretchable fabric when the strap is looped around the clip.

8. The controller of claim 7, further including a communications module, a memory storing multiple instructions and a processor configured to execute the instructions to communicate with an immersive application running in the headset and provide a trigger action from the one or more buttons when actuated by a finger of the headset user.

9. The controller of claim 7, wherein the lanyard secures the controller to the hand of the headset user when the headset user moves according to a fitness application running in the headset, and communicates with the fitness application via the one or more buttons.

10. The controller of claim 7, wherein the stretchable fabric includes a webbing with multiple integrated loops, and the sticky pads include polyester fibers that are hooked within the multiple integrated loops to securely attach the controller to a hand of a user.

11. The controller of claim 7, wherein the strap includes a tip formed with a hardened edge, and wherein the opening pin is actuated upon with the hardened edge to open the lid for the battery case.

12. The controller of claim 7, wherein the stretchable fabric includes an elastomeric material including nylon fibers.

13. The controller of claim 7, wherein the strap is configured to fix the controller to a hand of a user such that the user is free to activate one or more buttons in the controller without additionally holding the controller.

14. A device for virtual reality applications, comprising:
   a headset including a display, the display configured to provide an immersive reality environment for a user;
   a left-hand controller and a right-hand controller, each comprising:
     a handle portion configured to be grabbed by a hand of a headset user;
     a one or more buttons to be actuated by one or more fingers in the hand of the headset user;
     a battery case enclosed by a lid in the handle portion; and
     a lanyard to secure the left-hand controller and the right-hand controller in the hand of the headset user, the lanyard comprising:
       a strap anchored on a top portion of the lid; and
       a clip anchored to an opening pin in a bottom portion of the lid, wherein:
       the strap includes a stretchable fabric and multiple sticky pads on an outer face that adhere to the stretchable fabric when the strap is looped around the clip.

15. The device of claim 14, wherein the lanyard includes an end that is permanently fixed to an inner portion of the lid for the battery case.

16. The device of claim 14, wherein the stretchable fabric includes a webbing with multiple integrated loops, and the sticky pads include polyester fibers that are hooked within the multiple integrated loops to securely attach the left-hand controller or the right-hand controller to a hand of a user.

17. The device of claim 14, wherein the strap includes a tip formed with a hardened edge, and wherein the opening pin is actuated upon with the hardened edge to open the lid for the battery case.

18. The device of claim 14, wherein the stretchable fabric includes an elastomeric material including nylon fibers.

19. The device of claim 14, wherein the strap is configured to fix the left-hand controller or the right-hand controller to a user's hand such that the user is free to activate one or more buttons in the left-hand controller or the right-hand controller without additionally holding the left-hand controller or the right-hand controller.

20. The device of claim 14, wherein the immersive reality environment includes a fitness application, and the lanyard secures the left-hand controller or the right-hand controller to the hand of the headset user when the headset user moves according to the fitness application.

\* \* \* \* \*